United States Patent [19]

D'Ambrosia et al.

[11] Patent Number: 4,967,183
[45] Date of Patent: * Oct. 30, 1990

[54] METHOD OF INTRUSION DETECTION OVER A WIDE AREA

[75] Inventors: George C. D'Ambrosia, Penfield; Christopher A. Ludden, Fairport, both of N.Y.

[73] Assignee: Eastman Kodak Company, Rochester, N.Y.

[ * ] Notice: The portion of the term of this patent subsequent to Aug. 28, 2007 has been disclaimed.

[21] Appl. No.: 195,748

[22] Filed: May 18, 1988

[51] Int. Cl.$^5$ .................................................. G08B 13/18
[52] U.S. Cl. .................................... 340/552; 340/556; 356/1; 356/4
[58] Field of Search ............... 340/550, 552, 557, 556; 358/105, 87, 108; 356/1, 4; 367/93; 342/27, 28, 146

[56] References Cited

U.S. PATENT DOCUMENTS

| | | | |
|---|---|---|---|
| 4,319,332 | 3/1982 | Mehnert | 340/556 |
| 4,490,036 | 12/1984 | Anagnostopoulos | 356/1 |
| 4,490,037 | 12/1984 | Anagnostopoulos et al. | 356/1 |
| 4,512,000 | 4/1985 | Masuko | 340/552 |
| 4,521,106 | 6/1985 | Lambeth | 356/1 |
| 4,522,492 | 6/1985 | Masunaga | 356/1 |
| 4,527,891 | 7/1985 | Lambeth | 356/1 |
| 4,582,424 | 4/1986 | Kawabata | 356/1 |
| 4,601,574 | 7/1986 | Yamane et al. | 354/403 |
| 4,771,307 | 9/1988 | Kuno et al. | 354/403 |

Primary Examiner—Glen R. Swann, III
Attorney, Agent, or Firm—Robert L. Randall

[57] ABSTRACT

A method of scanning intrusion detection which is capable of monitoring a large volume of either interior or exterior space from a single relatively inexpensive unit. This method of intrusion detection comprises the steps of scanning a beam of infrared radiation about a field of view and receiving the radiation of the beam reflected from the field of view, generating a signal indicative of the distance from the device at which the beam has been reflected for each of a plurality of azimuthal sectors of the field of view, storing a plurality of reference signals which are indicative of the distance of reflection of the beam from each azimuthal sector of the field of view during a reference time period, comparing the signals from a selected time period with the reference signals, and generating an output signal if one of the signals is different from the respective reference signal.

12 Claims, 4 Drawing Sheets

METHOD OF INTRUSION DETECTION OVER A WIDE AREA

CROSS-REFERENCE TO RELATED APPLICATIONS

The present application is related to our co-pending applications entitled AN INTRUSION DETECTION DEVICE, Ser. No. 195,746; METHOD OF INTRUSION DETECTION, Ser. No. 195,747; and A SCANNING INTRUSION DETECTION DEVICE, Ser. No. 195,741, all filed on even data herewith.

BACKGROUND OF THE INVENTION

1. Field of the Invention

The present invention relates to a method of intrusion detection for detecting the presence and location of objects in space and, more particularly, to a method utilizing an active infrared system for actively locating objects in space by emitting a beam of infrared radiation into a field of view and measuring the distance from the device at which the beam is reflected by the field of view during a selected time period. The present method is capable of monitoring a large volume of space with a single unit which is relatively inexpensive and foolproof. The field of view is scanned with an infrared emitter and a reflection receiving means. A signal is generated indicative of the distance of reflection of the beam from each azimuthal sector of the field of view. The distance of the reflection is then compared to a reference distance, with an output signal being generated if the detected distance differs from the reference distance in a preselected manner.

2. Background Art

In recent years many forms of intrusion detection devices, or surveillance systems, have been developed to monitor an area or space, to protect against the entry of unauthorized personnel into that area or space, and to provide an alarm signal when such entry occurs. A variety of technologies have been applied to such intrusion detection systems in an attempt to obtain a satisfactory device that provides to requisite sensitivity to intrusion into the protected space without generating distracting, time-consuming, and costly false alarms. Such false alarms can result from changing environmental conditions, wind-blown debris, or the intrusion into the protected space of birds or other small animals. Among the technologies employed for intrusion detection systems of the prior art are those based on sonic or unltrasonic/acoustical detectors, photoelectric break-beam devices, passive infrared detectors, video systems, and radar or microwave-based systems.

The sonic, ultrasonic or acoustical devices are illustrated in U.S. Pat. Nos. 4,499,564, 4,382,291, 4,229,811 and 4,639,902. In the devices disclosed in these patents the intrusion detection systems utilize an acoustical signal, either sonic or ultrasonic, which is transmitted into the space to be protected. The acoustical signal is reflected off of objects in the space or the walls forming the perimeter of the space and is collected by an acoustical receiver. The return signal represents the total reflected energy pattern for that space. A change in the signal received indicates some change in the space protected; however, these systems do not provide any means of identifying where, either directionally or distance-wise, in the protected space that the change has occurred. Thus, the only information derivable from such systems is whether or not such a change has occurred which then requires some form of follow-up by the security force. An additional limitation of systems of this type is that they are generally unacceptable in anything but a closed environment since they are subject to false alarms from naturally occurring sound changes such as generated by wind, thunder, or other naturally occurring sounds in an open environment.

The photoelectric break-beam devices are illustrated in U.S. Pat. Nos. 3,875,403, 4,239,961, 4,310,756, 4,384,280 and 4,514,625. In the devices disclosed, the intrusion detection system uses an active photo-beam projected into the area under surveillance. A detector sees the continuous beam at the opposite end of the detection zone. If the photo-beam is broken by an intruder, then an alarm is sounded. This type of system does not give any information above the distance of the intruder from the detector device. This system also requires two head units with the protection zone between them. This leads to a more complex installation than if only one unit is required.

Passive infrared detection technology is illustrated in U.S. Pat. Nos. 3,476,946, 3,476,947, 3,476,948 and 3,475,608. With systems such has these, changes in the infrared content of the light received by the device from the area under control is monitored and an alarm signal is generated if the infrared content changes. This is based on the presumption that the infrared content of the light will be affected by intruders, particularly individuals, entering into the controlled space. However, it has been found that such infrared detectors are falsely triggered by normal changes in the infrared content of the light in a space due to ordinary changes in the sun as well as the effects of clouds passing over the sun. Still further, such systems do not provide distance or direction information and thus require follow-up by security staff to determine the true nature of the cause that triggered the alarm.

The video based intrusion detecting systems utilize a video camera to view an area under protection and are illustrated in U.S. Pat. Nos. 3,823,261; 3,932,703 and 4,408,224. Typically, the video signal is digitized and stored in a memory. Thereafter, the video signal is compared with a reference signal stored in the memory and, when a difference is detected, an alarm is sounded. These systems use changes in scene illumination to determine an alarm condition rather than changes in object distances and therefore, unless the space to be observed and protected is carefully controlled and isolated from changes in environmental illumination, such changes will result in false alarms. As a result, such a system is less than satisfactory for exterior spaces. Furthermore, the amount of data that is necessarily stored to obtain reasonable resolution of the image of the space being protected requires a significant quantity of expensive computer memory.

Systems employing radar or other microwave technology are illustrated in U.S. Pat. No. 4,197,537. In this particular system a single microwave signal source is used to bathe the space with microwave energy. A receiver detects the return signal reflected from the space being protected which can be compared with a reference signal to detect an intrusion thereinto. This particular system is unable to identify the precise location of the intruder. While other radar/microwave-based systems can provide such information, their cost is at least an order of magnitude greater than the cost of the other systems described above as well as that of the present invention.

Thus, an intrusion detection method which can monitor a relatively large volume of interior or exterior space and provide protection to a wide area and provide location information about an intruder, is reasonably priced, sufficiently sensitive and yet relatively immune to false alarms would be very attractive to the security industry.

SUMMARY OF THE INVENTION

Accordingly, the present invention provides a method of intrusion detection which comprises the steps of projecting a beam of radiation toward a field of view receiving the radiation of the beam reflected from the field of view, scanning the field of view with the emitter and the reflection receiving means, generating a signal indicative of the distance from the device at which the beam has been reflected for each of a plurality of azimuthal sectors of the field of view, storing a plurality of reference signals which are indicative of the distance of reflection of the beam from each azimuthal sector of the field of view during a reference time period, comparing the signals with the reference signals, and generating an output signal if one of the signals is different from the respective reference signal.

Moreover, the present invention provides a method of intrusion detection utilizing an infrared laser and a detector means sensitive to infrared radiation which includes a plurality of detector means and a reflected beam deflecting means which deflects the reflected beam onto a specific detector determined by the distance from the device at which the beam has been reflected by the field of view.

Various means for practicing the invention and other features and advantages thereof will be apparent from the following detailed description of illustrative preferred embodiments of the invention, reference being made to the accompanying drawings.

DETAILED DESCRIPTION OF THE PREFERRED EMBODIMENTS

Figure 1:
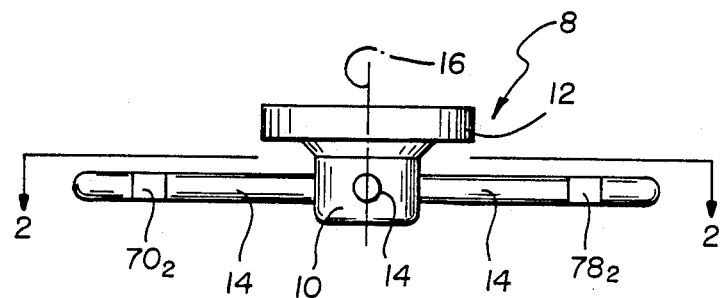
FIG. 1 is an elevation view of an apparatus for performing the method of the preferred embodiment of the present invention.
Figure 6:
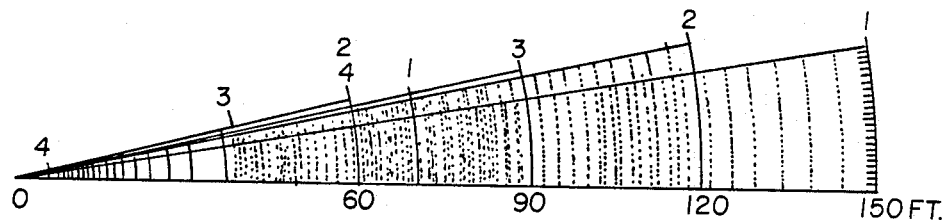
FIG. 6 is a more detailed description of a portion of the fields of view scanned by a preferred embodiment of the present invention.
Figure 5:
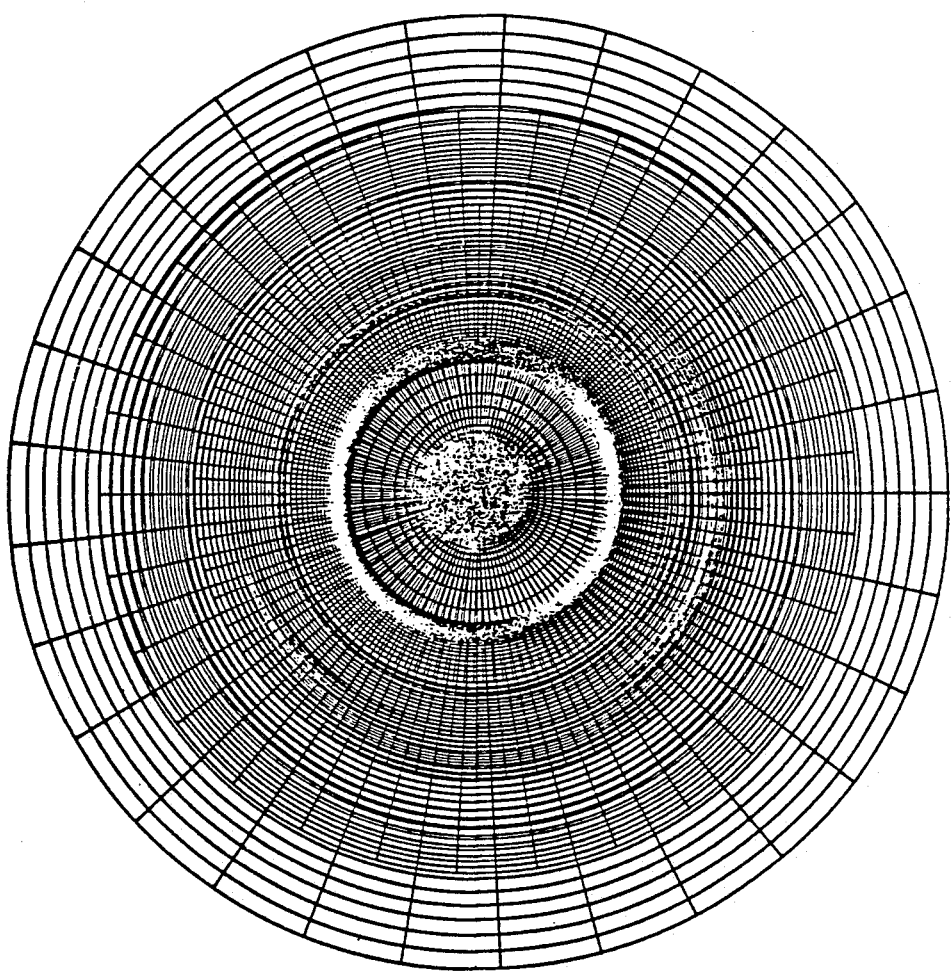
FIG. 5 is a schematic plan view of the field of view protected by the method of the present invention.

An elevation view of an intrusion detection device adapted to practice the method according to the present invention is illustrated in FIG. 1, and comprises a horizontally rotating head member 10 mounted on a stationary base member 12. The rotating head member carries a plurality of radially extending arms 14 arranged in pairs on opposite sides of the axis of rotation 16. In the embodiment illustrated, the head member is provided with four arm members disposed at 90 degrees with each other. A plurality of radiation emitters 70 and a plurality of radiation receiving means 78 are mounted on the radial arms 14 as cooperating pairs with the emitter mounted on one of a pair of arms and the receiver mounted on the other of the pair, with the emitter and receiving means of each pair being arranged to face the same direction. Each of the emitters and its cooperating receiving means are mounted at a predetermined fixed spacing from each other to scan a common field of view synchronously. Thus, emitter $70_1$ and receiver $78_1$ are arranged as a cooperating pair facing the same direction from opposite ends of radially opposed arms 14. Similarly, emitter $70_2$ and detector $78_2$, mounted on the same pair of radial arms, face the opposite direction from the first pair and are spaced a closer distance apart. The same is true of emitter-receiver pairs $70_3$-$78_3$ and $70_4$-$78_4$. In accordance with well known triangulation concepts, the more widely spaced pairs, $70_1$-$78_1$, are intended for scanning the more distant field of view and the closest spaced pairs, $70_4$-$78_4$, are aimed at the nearest field of view as illustrated in FIGS. 5–7, which will be described in more detail hereinbelow.

Figure 4:
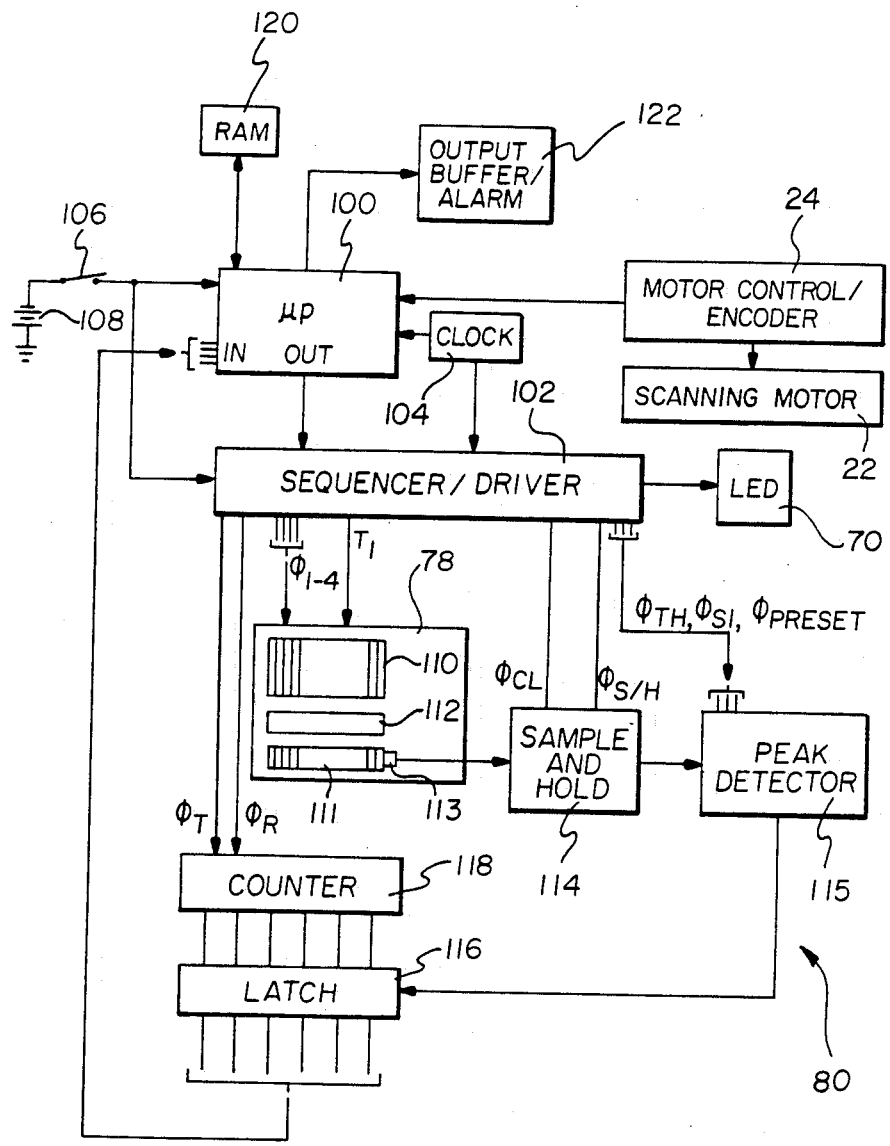
FIG. 4 is a schematic diagram of an electrical circuit embodiment of the apparatus illustrated in FIG. 3.

The intrusion detection device 8 is provided with a scanning motor 22, shown schematically in FIG. 4, mounted in the base member 12 for rotating the head member 10. A motor control/encoder 24, of a type well known in the art, is provided to accurately drive the scanning motor 22 and to provide accurate location information of the precise rotational position of the head member to the microprocessor 100 of the processing electronics, which will be described more thoroughly herein below.

Figure 3:
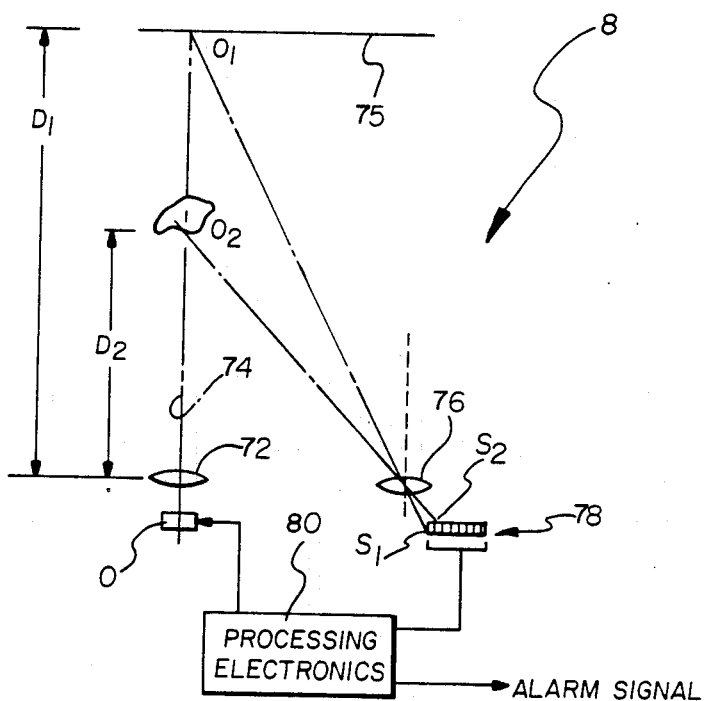
FIG. 3 is a schematic illustration of a preferred embodiment of one portion of a device for practicing the method of the present invention.

A schematic illustration of one portion of an intrusion detection device 8 according to the present invention is illustrated in FIG. 3. In this illustration, one emitter-receiving means pair is shown along with its field of view. As illustrated, a beam of light is projected into the area or space to be protected, the field of view of the device, and, preferably a field of view bounded by a periphery, such as a wall or floor. A spot of light is illuminated by the beam and an image sensor detects the location of the spot in the image of the field of view to determine the distance to the spot. Means for projecting a beam of light, such as a light emitting diode (LED) 70 is provided with an associated lens 72 for projecting a beam of light into the field of view of the device. Preferably, the diode 70 emits an infrared beam; more particularly, the diode is an infrared laser diode (LD) which produces an intense, coherent beam of infrared radiation. (If the beam is generated by a collimated or highly directional source, lens 72 may not be necessary). The beam is projected along a path 74 to illuminate a spot $0_1$ on a bounding peripheral wall 75. The scene is imaged by a second lens 76 onto a light detector means such as an array of photosensors 78 which, in the preferred embodiment, are responsive to infrared radiation. The lens 76, or a comparable light diverting means such as a mirror or holographic element, diverts the reflected beam onto a specific photosensor determined by the distance from the device at which the beam has been reflected. The signals produced by the photosensors are analyzed by processing electronics 80 to determine the distance from the device that the beam has been reflected by the field of view. The processing electronics then produce a signal representing the distance from the device to the object. As illustrated by example in FIG. 1, the apparent position of the illuminated spot in the field of view is a function of the distance along light path 74 to the object. For an object $O_1$ located at a distance $D_1$ from the intrusion detection device, the image of the illuminated spot will fall on the sensor array at location $S_1$. For an object $O_2$ at a closer distance $D_2$, the image of the spot will fall on the sensor array at location $S_2$. By examining the output of the sensor array, the processing electronics 80 determines, for example, by comparing the outputs of the elements to determine which output is at a maximum, the location of the illuminated spot in the field of view and thereby the distance from the intrusion detection device to the object. The distance signal generated is then transferred to a comparator (which may be incorporated in the processing electronics 80) which compares a selected (current) distance signal with a reference signal which has been previously stored in a memory. If the comparator determines that the selected signal differs from the reference signal in a predetermined manner, then an output or alarm signal is generated.

Referring now to FIG. 4, the processing electronics 80 of the intrusion detection device is illustrated in a more detailed manner. The overall control of the intrusion detection device is provided by a programmed microprocessor 100. The microprocessor 100 is supplied with a master clock timing signal from a clock circuit 104 and with power via a main power switch 106 from a source, such as battery 108. The microprocessor is also provided with head positional information from the encoder 24. The image sensing portion of the intrusion detection device includes a serially scanned linear image sensor 78 of the type having an array of photosensors 110 and means for serially addressing the photosensors such as a CCD shift register 111. Such serially scanned linear image sensors are readily available commercially and generally require a transfer signal $T_1$ to actuate a transfer gate 112 to transfer photosignals generated in the photosensors in parallel to the shift register 111, and a multiphase (e.g. 4-phase) clock signal $\phi_{1-4}$ to cause the CCD shift register to deliver the photosignals serially to an output diode 113. The 4-phase clock signals $\phi_{1-4}$ and the transfer signal $T_1$ are supplied to the linear sensor array 109 from sequencer/driver 102 to produce output signals from the CCD shift register 111. The signals from the CCD shift register are sampled by sample and hold circuit 114 and are supplied to peak detector circuit 115 that produces a pulse each time a photosignal larger than any previous photosignal is received from image sensor 109. The output of the peak detector circuit is supplied to a latch circuit 116. Latch circuit 116 is connected to the outputs of the digital counter 118. Counter 118 receives a reset signal $\phi_R$ and a timing signal $\phi_T$ having a frequency related to the 4-phase clock signals $\phi_{1-4}$. The output of the latch circuit 116 is supplied to an input port of microprocessor 100. The sequencer/driver circuit 102 also powers an LED 70 in the beam forming portion of the intrusion detection device. The microprocessor 100 is also connected to a RAM memory device 120 and to an output buffer/alarm device 122. Much of the rangefinding portion of the present invention is taught in U.S. Pat. Nos. 4,521,106; 4,527,891; 4,490,036 and 4,490,037, all of which are incorporated herein by reference. The foregoing description has, of course, been for a single emitter-receiver pair. In the embodiment illustrated, four such pairs are employed, all under the overall control of the one microprocessor 100.

Figure 2:
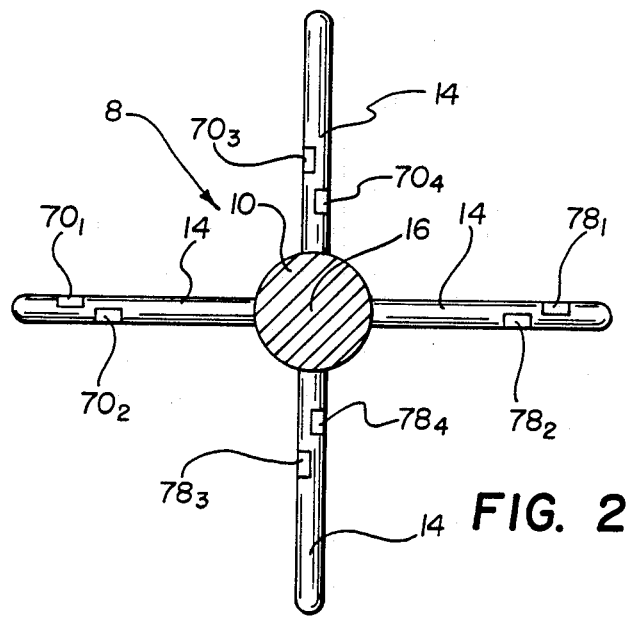
FIG. 2 is a sectional plan view of the intrusion detection device taken along line 2—2 of FIG. 1.

The operation of the intrusion detection device of the preferred embodiment illustrated in FIG. 1 will now be described with reference to the other illustrations. As illustrated in FIGS. 5 and 6, the intrusion detection device 8 can be mounted to the ceiling of a structure, and when, as illustrated, is mounted at a height of 50 feet above the ground level, an area of over 70,000 square feet and having a radius of 150 feet can be monitored. Utilizing the embodiment illustrated in FIGS. 1 and 2, the cooperating pairs will monitor substantially the entire area within the 150 foot radius beneath the scanning device. Thus cooperating pairs $70_1$-$78_1$ can be aimed to include a conic section having an inner radius of 71 feet and an outer radius of 150 feet. The cooperating pair $70_2$-$78_2$ can be aimed to include a conic section having an inner radius of 62 feet and an outer radius of 120 feet. The cooperating pair $70_3$-$78_3$ can be aimed to include a conic section having an inner radius of 41 feet and an outer radius of 90 feet. The cooperating pair $70_4$-$78_4$, covers the innermost region with a conic section having an inner radius of 6 feet and an outer radius of 60 feet. A graphic illustration of this coverage is shown in FIG. 7 which illustrates the overlapping nature of the conic sections covered by the different cooperating pairs of the emitter-receiver means. It is noted that the sectors are not covered simultaneously due to the arrangement of the pairs on different faces of different arms, but during the scan of the detector head an entire 360 degree circle will be scanned so that the coverage is effectively as illustrated. In FIG. 7, the emitter-receiver pair $70_1$-$78_1$ covers the conic section between the arcs marked 1 and 1 in the illustration. Similarly, the arcs 2 and 2, arcs 3 and 3, and arcs 4 and 4 represent the respective areas covered by the cooperating pairs 2, 3 and 4. Although not illustrated, it is contemplated that the respective cooperating pairs may be individually aimed by adjustments in the arms 14 of the device to thereby permit the operator to select the field of view which is to be protected.

The device is activated by closing power switch 106, starting the scanning motor 22 along with the motor control/encoder 24 and the microprocessor 100. The head is rotated at a speed of 1 rpm and the encoder, in the preferred embodiment, is arranged to divide the full scan into 1024 separate sectors for each 360 degrees of rotation. A specific example of a preferred embodiment of a single cooperating pair of emitter and receiver utilizes an infrared laser diode having a power of 30 milliwatts and an effective pulse width of 250 microseconds. The laser diode (LD) output has a spectral peak at approximately 830 nanometers. The emitter lens 72 has a focal length of 36 millimeters, a transmittance of 0.92, and an f-number equal to 1.0. The receiver lens is identical to the emitter lens. The received signal is projected by lens 76 onto an array of photodiodes 78 having 28 elements. The receiver lens may be provided with a narrow band filter to limit the light received to generally the same band as projected by the emitter. An image sensor particularly adapted for use in a rangefinder, including means for removing the background signal from the photosignals produced by the photosensors, leaving only photosignals due to the illuminated spot, is disclosed in U.S. Pat. No. 4,490,037, the disclosure of which is incorporated herein by reference. The CCD shift register 111 is preferably provided with two CCD pixels for each photosensor. One of the pixels is arranged to store the charge developed during an ambient only measurement, while the other pixel stores the charge developed by the ambient plus the LD signal measurement performed during the activation of the LD. The sample and hold circuit 114 is arranged to subtract the ambient charge from the signal plus ambient charge to generate an output signal representing the infrared generated by the laser diode only. This increases the signal to noise ratio of the device over the possible should both ambient and LD generated signal charge be handled together. Only the infrared signal alone is sent to the peak detector 115 for generating the distance signal.

Each laser diode 70, and its associated lens 72 project a beam of infrared radiation into its respective field of view. A spot of light is illuminated where the beam intersects the ground or perimeter which is then imaged by the lens 76 associated with the array of sensors 78. The signals produced by the photosensors are then analyzed by the microprocessors 100 and, during an initial referenced time period, are fed as distance signal s into the RAM 120 as a reference distance for each separate azimuthal sector as identified by the encoder 24. Thereafter, as the intrusion detection scanner device is operated, the sequencer/driver 102 generates a signal activating the laser diode 70, under the control of the encoder 24 and the microprocessor 100, for each separate azimuthal sector of the scan. The laser diode 70 produces a pulse of radiation for each azimuthal sector of the scan. The pulse is projected into the field of view of that particular cooperating pair and illuminates each individual sector. The cooperating receiver 78 images the illuminated spot onto its array of sensors 110. The sample and hold circuit 114 removes the ambient from the ambient plus the LD signal and transfer the LD only signal to the peak detector circuit 115 which in conjunction with counter 118 determines the zone distance for that sector. Latch 116 latches the zone information and transfers it to the microprocessor 100. Each distance signal for an individual sector is compared with the reference signal for the same sector stored in the RAM 120. If the selected (current) distance signal is determined by the comparator to differ from the reference distance signal stored in the RAM in a predetermined manner, a signal is transferred to the output buffer/alarm 122 which indicates that something has changed the distance signal received by the intrusion detection device.

The versatility and sophistication of the intrusion detection system provided by the present invention is limited only by the application requirements, and by the capacity of the RAM and the microprocessor. For example, it is contemplated that the microprocessor will not only compare signals from the same azimuthal sector with the reference signal for that sector, but will also compare signals between adjacent sectors as well as between adjacent scanning zone fields of view. Thus, it will be possible to actually generate a record of an intrusion path as an intruder moves from sector to sector and zone to zone during its incursion into the protected area.

The fields of view illustrated for the device of the present invention illustrated in FIG. 6 is intended only to give an idea of the number of sectors possible. In this illustration, only 29 sectors are shown instead of the 1024 contemplated for the preferred example. Moreover, only 17 annular zones are illustrated, while the preferred device will have at least 62 separate and distinct zones (with many being duplicated by overlapping annular zones of coverage) resulting in a total of at least 63,000 separate sectors, each of which may be individually monitored. Accordingly, to protect an area having a radius of 150 feet, each sector will have an average area of just over one square foot.

ALTERNATIVE EMBODIMENTS

According to an alternative embodiment, each cooperating pair of emitter-receiving means is arranged to view a field of view other than a field of view scanned by another of the cooperating pairs. In a further alternative embodiment, each cooperating pair views a field which partially overlaps the field of view scanned by another cooperating pair.

According to another embodiment of the present invention, the unit could appear without a plurality of radially extending arms 14, but could have a plurality of radiation emitters and a plurality of radiation receiving means located within the horizontal rotating head member.

According to another embodiment of the present invention, the comparator portion of the microprocessor 100 is arranged to compare signals from the same cooperating pair and from a cooperating pair scanning an adjacent field of view.

According to still another embodiment of the present invention, the comparator portion of the microprocessor 100 is arranged to compare signals from the same cooperating pair and from adjacent azimuthal sectors.

Still further, another embodiment of the present invention contemplates the comparison of a signal with a reference signal from the same cooperating pair and from a cooperating pair scanning an adjacent field of view from both the same and adjacent azimuthal sectors. Other combinations and permutations will be readily apparent.

In another alternative embodiment, the reference signal stored in the RAM 120 is a signal selected from a previous time period in the operation of the device. In some instances it may be desirable to select the previous time period from the next preceding time period so that the reference signal is continuously updated and an alarm signal is only generated if several sequential time periods each contain a different distance signal for that cooperating pair. Still further, the reference signals may be the result of multiple reference scans.

The present invention thus provides a method of intrusion detection which not only senses an intruder entering a large protected space, but provides the additional information of the location with respect to the detector at which the intrusion has occurred. Moreover, the present invention provides a method which may be successfully utilized to protect either interior or exterior space. Furthermore, the present device provides the desired sensitivity without the undesirable false alarms often attributable to prior art intrusion detection devices. Moreover, the present invention provides a system comparable in its capabilities to a radar-based system at a fraction of the cost of such radar systems. Still further, the present invention provides an intrusion detection device that can be used in the uncontrolled environment of the out-of-doors without the disadvantages often attributable to intrusion detection devices of the prior art.

The invention has been described in detail with particular reference to a presently preferred embodiment, but it will be understood that variations and modifications can be effected within the spirit and scope of the invention.

What is claimed is:

1. A method of intrusion detection utilizing a detection device which includes a plurality of infrared radiation emitters and a plurality of reflection-receiving means arranged in cooperating pairs, each of said reflection-receiving means having a deflecting means and a plurality of detector means, comprising the steps of projecting a beam of infrared radiation toward a field of view from each emitter whereby at least a portion of each said beam is reflected by the field of view, receiving the reflected radiation of each said beam reflected from said field of view with the cooperating reflection-receiving means and deflecting said received beam onto a specific detector means as determined by the distance from said device at which said beam has been reflected by said field of view, scanning a portion of said field of view with each of said cooperating pairs that is different from the portion of said field of view scanned by the other cooperating pairs, determining by triangulation the distance from said device at which each said beam has been reflected for each of a plurality of azimuthal sectors of said portion of said scanned field of view, generating a plurality of signals indicative of said distances, storing a plurality of reference signals indicative of the distance from said device at which said beam has been reflected by said portion of said field of view in each azimuthal sector during a reference time period, comparing said signals with said reference signals, and generating an output signal if one of said signals is different from the respective reference signal.

2. The method of intrusion detection according to claim 1 including the step of comparing a signal with a reference signal from the same azimuthal sector.

3. The method of intrusion detection according to claim 1 including the step of comparing a signal with a reference signal from an adjacent azimuthal sector.

4. The method of intrusion detection according to claim 1 including the step of comparing a signal with a reference signal from both the same and adjacent azimuthal sectors.

5. The method of intrusion detection according to claim 1 including the step of scanning a unique field of view with each cooperating pair.

6. The method of intrusion detection according to claim 1 including the step of scanning a field of view with at least one cooperating pair which partially overlaps the field of view scanned by another cooperating pair.

7. The method of intrusion detection according to claim 1 including the step of comparing a signal with a reference signal from the same cooperating pair and from the same azimuthal sector.

8. The method of intrusion detection according to claim 1 including the step of comparing a signal with a reference signal from the same cooperating pair and from adjacent azimuthal sectors.

9. The method of intrusion detection according to claim 1 including the step of comparing a signal with a reference signal from the same cooperating pair and from both the same and adjacent azimuthal sectors.

10. The method of intrusion detection according to claim 1 including the step of comparing a signal with a reference signal from the same cooperating pair and from a cooperating pair scanning an adjacent field of view and from the same azimuthal sector.

11. The method of intrusion detection according to claim 1 including the step of comparing a signal with a reference signal from the same cooperating pair and from a cooperating pair scanning an adjacent field of view and from adjacent azimuthal sectors.

12. The method of intrusion detection according to claim 1 including the step of comparing a signal with a reference signal from the same cooperating pair and from a cooperating pair scanning an adjacent field of view from both the same and adjacent azimuthal sectors.

* * * * *